(12) United States Patent
Martini

(10) Patent No.: US 11,459,186 B2
(45) Date of Patent: Oct. 4, 2022

(54) STEP-WISE FEEDING DEVICE OF CONTAINERS

(71) Applicant: OCME S.R.L., Parma (IT)

(72) Inventor: Umberto Martini, Parma (IT)

(73) Assignee: OCME S.R.L., Parma (IT)

( * ) Notice: Subject to any disclaimer, the term of this patent is extended or adjusted under 35 U.S.C. 154(b) by 0 days.

(21) Appl. No.: 17/255,148

(22) PCT Filed: Jun. 28, 2019

(86) PCT No.: PCT/IB2019/055510
§ 371 (c)(1),
(2) Date: Dec. 22, 2020

(87) PCT Pub. No.: WO2020/008315
PCT Pub. Date: Jan. 9, 2020

(65) Prior Publication Data
US 2021/0269251 A1 Sep. 2, 2021

(30) Foreign Application Priority Data
Jul. 2, 2018 (IT) .................... 102018000006863

(51) Int. Cl.
*B65G 47/84* (2006.01)
*B65G 47/22* (2006.01)

(52) U.S. Cl.
CPC ...... *B65G 47/22* (2013.01); *B65G 2201/0261* (2013.01)

(58) Field of Classification Search
CPC ................................ B65G 47/22; B65G 47/84
(Continued)

(56) References Cited

U.S. PATENT DOCUMENTS 4,807,421 A * 2/1989 Araki .................. A23L 3/04
198/803.11
5,154,380 A * 10/1992 Risca .................. A47G 23/0216
248/154
(Continued)

FOREIGN PATENT DOCUMENTS

ES 2 224 786 A1 3/2005
FR 3 048 681 A1 9/2017

OTHER PUBLICATIONS

International Search Report dated Oct. 18, 2019 in PCT/IB2019/055510 filed on Jun. 28, 2019.

*Primary Examiner* — Douglas A Hess
(74) *Attorney, Agent, or Firm* — Oblon, McClelland, Maier & Neustadt, L.L.P.

(57) ABSTRACT

A step-wise feeding device of containers equipped with a mouth, a plane of symmetry passing through the mouth, includes support bases and transportation means of the support bases in a feeding direction. Each support base can be associated with and dissociated from the transportation means, and each support base includes a clamping group of a container, the clamping group having a closed clamping position and an open loading and unloading position. The clamping group is a gripper-type including two side boards, sustained by supports on opposite sides of the support base, which move in a self-centering manner with respect to an axis. Each support base has a bearing plane for the bottom of the container, on which a virtual point is defined, arranged on a longitudinal axis at a fixed distance from a front end of the support base, for centering the mouth of any container arranged on the plane.

9 Claims, 2 Drawing Sheets

(58) Field of Classification Search
USPC ......... 198/456, 867.07, 867.08, 803.4, 803.9
See application file for complete search history.

(56) References Cited

U.S. PATENT DOCUMENTS

| | | | | |
|---|---|---|---|---|
| 5,509,524 | A * | 4/1996 | Ohmori | B65B 43/60 |
| | | | | 198/465.1 |
| 6,176,369 | B1 * | 1/2001 | Petrovic | B65G 17/002 |
| | | | | 198/803.14 |
| 8,132,664 | B2 * | 3/2012 | Paskell | B65G 17/002 |
| | | | | 198/803.14 |
| 8,205,743 | B2 * | 6/2012 | Meinzinger | B65G 35/08 |
| | | | | 198/867.14 |
| 8,973,745 | B2 * | 3/2015 | Scheibenpflug | B65G 47/846 |
| | | | | 198/867.01 |
| 9,609,794 | B2 * | 3/2017 | Endress | B23K 1/0016 |
| 9,908,699 | B2 * | 3/2018 | Miyagawa | B65G 1/0492 |

* cited by examiner

STEP-WISE FEEDING DEVICE OF CONTAINERS

The present invention relates to a step-wise feeding device of containers, in particular of containers equipped with a mouth and with a plane of symmetry passing through the mouth, towards linear machines or rotary machines, such as filling, capping and labelling machines.

According to what is known, containers, which can range from a capacity of a few cc to 30 litres, having various shapes, are transferred, for example to a rotatory machine, or to a linear machine, generally from a transportation on which they are arranged in a single line, attached to one another. Thus, the containers reach the machine, which must select them one by one and insert them into a series of stars and guides, which convey the single containers into the machine in all working steps, which may be filling, capping, labelling or other, until they reach the last star, which transfers the container onto the outlet transportation.

Generally, at present, two types of traditional methods are used for conveying a container to a rotatory or linear machine.

A first solution provides that for each container sample one or more augers are built to be placed at the inlet, with the function of selecting the container. The same is done for all of the stars, which transfer the container between one carousel and another and equally, it is done for the guides opposite to the stars, which serve to hold the container. Thus, a series of pieces, called equipment, are built for each container template, dedicated to the container itself.

These pieces are fixed to the machine by means of connections, which can be screws or quick devices without the use of keys. In any case, when the container is changed, the operator must remove all of the equipment and replace it with the equipment corresponding to the new container.

This first solution involves various problems, such as:
each time a container format is changed, the operator takes considerable time, which is detracted from normal production with a consequent loss of production;
for each container format it is necessary to construct and have the special equipment:
all of the equipment, which is rather bulky, has to be stored and therefore, it is necessary to have adequate space.

A second solution provides that for each container sample, a template called a "puck", made of plastic, is to be built with a generally rectangular or oval shape and an adequate height, which has an internal cavity, conveniently configured to correspond to the outer profile of the container. Essentially, it is a cradle inside which the container is inserted. The outer dimensions of this cradle are always the same, while the internal cavity is dedicated to the template of the specific format, which it must contain.

The cradles with the containers inside are transferred to the rotatory machine, generally from a transportation on which they are positioned in a single line, attached to one another. One or more augers arranged at the inlet to the machine have the function of selecting the cradles, giving them to the stars, which transfer the container between one carousel and another, and the guides opposite the stars serve to hold the cradles in the right position. Thus, a series of pieces, called equipment, are built on the basis of the outer template of the cradle, dedicated to handling the cradle containing the container. These pieces are fixed to the machine by fixed connections.

The positive aspect of this second solution is that, on conveying these cradles, the equipment on the machine is not removed and replaced when the container is changed. In any case, when the container is changed, the operator must remove all of the cradles and replace them with those corresponding to the new container.

This second solution involves various problems:
each time a container format is changed, the operator takes time to replace the cradles, time, which is detracted from normal production, with a consequent loss of production;
for each container format, it is necessary to construct and have the special cradles for the container;
all of the cradles, which are rather bulky, have to be stored and therefore, it is necessary to have adequate space.

According to an alternative embodiment, shown in document FR 3 048 681 A, the cradle adapted to contain the container can be realised with varying dimensions, manually, when the format of the container is changed. According to such solution, on changing the format, even though all of the cradles do not need to be removed, it is necessary to make a manual adjustment of the same.

Document ES 2 224 786 A describes the realisation of a step-wise feeding device of containers, comprising a plurality of support bases according to the preamble in claim 1. The clamping group has clamps arranged transversely to the feeding direction of the support base. The clamps act on the containers with an approaching and distancing movement in a direction parallel to the feeding direction of the support base.

This allows the containers to be inserted on the support bases only from above and the consequent use of a machine with alternating movement. However, such solution is not suitable for use in continuous movement machines.

It is an object of the present invention to realise a step-wise feeding device of containers, which overcomes the drawbacks of the described prior art.

It is another object of the present invention to realise a step-wise feeding device of containers, particularly adapted for containers equipped with a mouth and with a plane of symmetry passing through the mouth.

It is another object to realise a step-wise feeding device of containers, for feeding towards linear machines or towards rotary machines.

It is another object of the present invention to realise a step-wise feeding device of containers, which is particularly simple and functional, with contained costs.

These objects according to the present invention are achieved by realising a step-wise feeding device of containers, as set out in claim 1.

Further features are comprised in the dependent claims.

The features and advantages of a step-wise feeding device of containers according to the present invention will become clearer from the following description, which is to be understood as exemplifying and not limiting, with reference to the appended schematic drawings, wherein.

Figure 3:
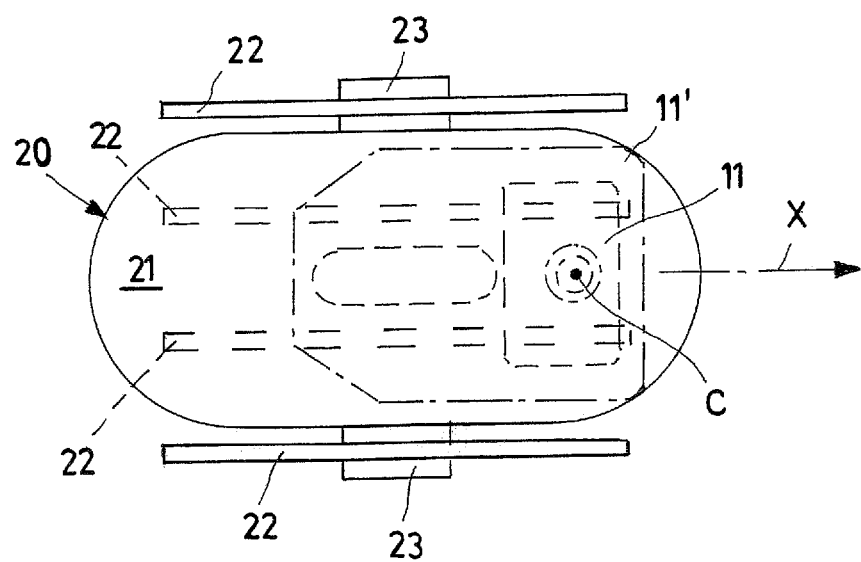
FIG. 3 is a plan view of the support base of the device in FIG. 1, schematically showing an open configuration with a continuous line and a closed configuration with a dotted line.
Figure 4:
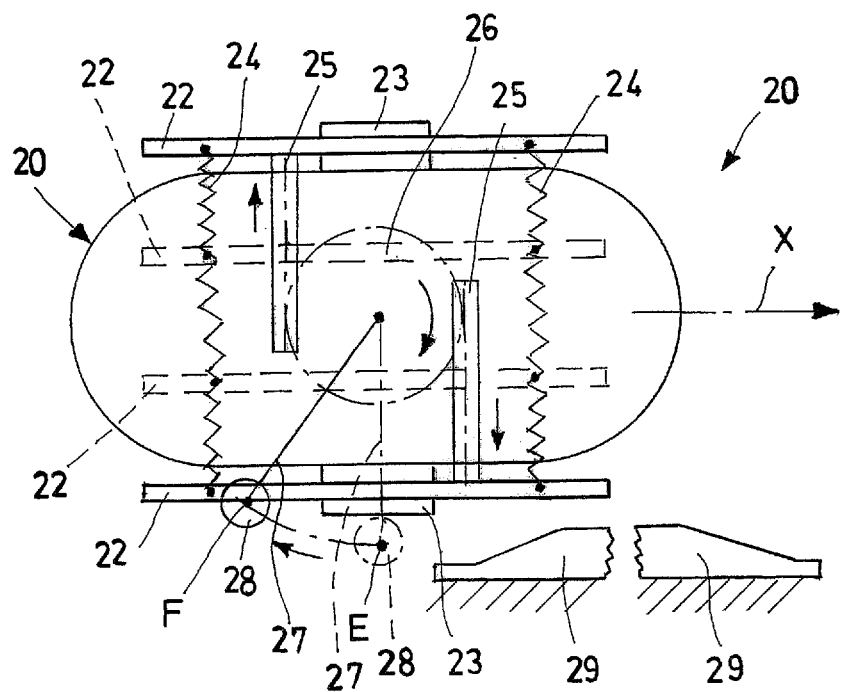

FIG. 4 schematically shows the actuation kinematics of the clamping group of the device in FIG. 3 through a partially split view of the same.

With reference to the figures, a step-wise feeding device of containers is shown, globally indicated with 10, in particular of containers 11, 11' equipped with a mouth 12 and with a plane of symmetry Y passing through the mouth 12 and in particular through the axis Z of the mouth.

The step-wise feeding device of containers 10 comprises a plurality of support bases 20, each having a bearing plane 21 for the bottom of a container 11, 11'. In the illustrated example, the support base 20 is symmetrical to a plane of symmetry, comprising a longitudinal axis X, coinciding with the feeding direction.

Each of the support bases 20 can be associated, in selectable positions and depending on the characteristics of the containers 11, 11' to be conveyed, and disassociated with respect to transportation means 30, conveying it towards linear machines or rotary machines, such as filling, capping and labelling machines. Each support base 20 has a suitable shape for engaging with the transportation means.

Figure 2:
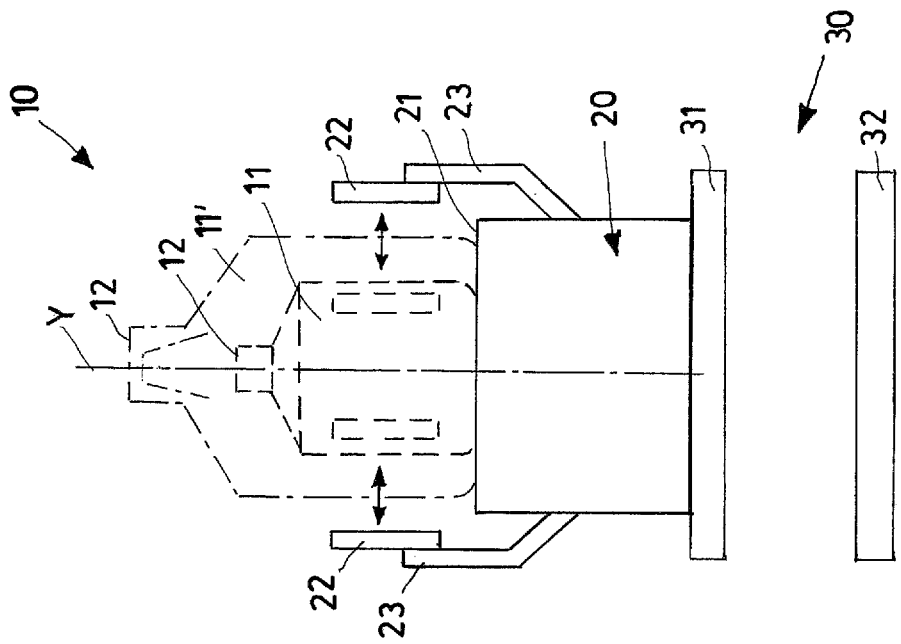
FIG. 2 is a raised front view of the device in FIG. 1.
Figure 1:
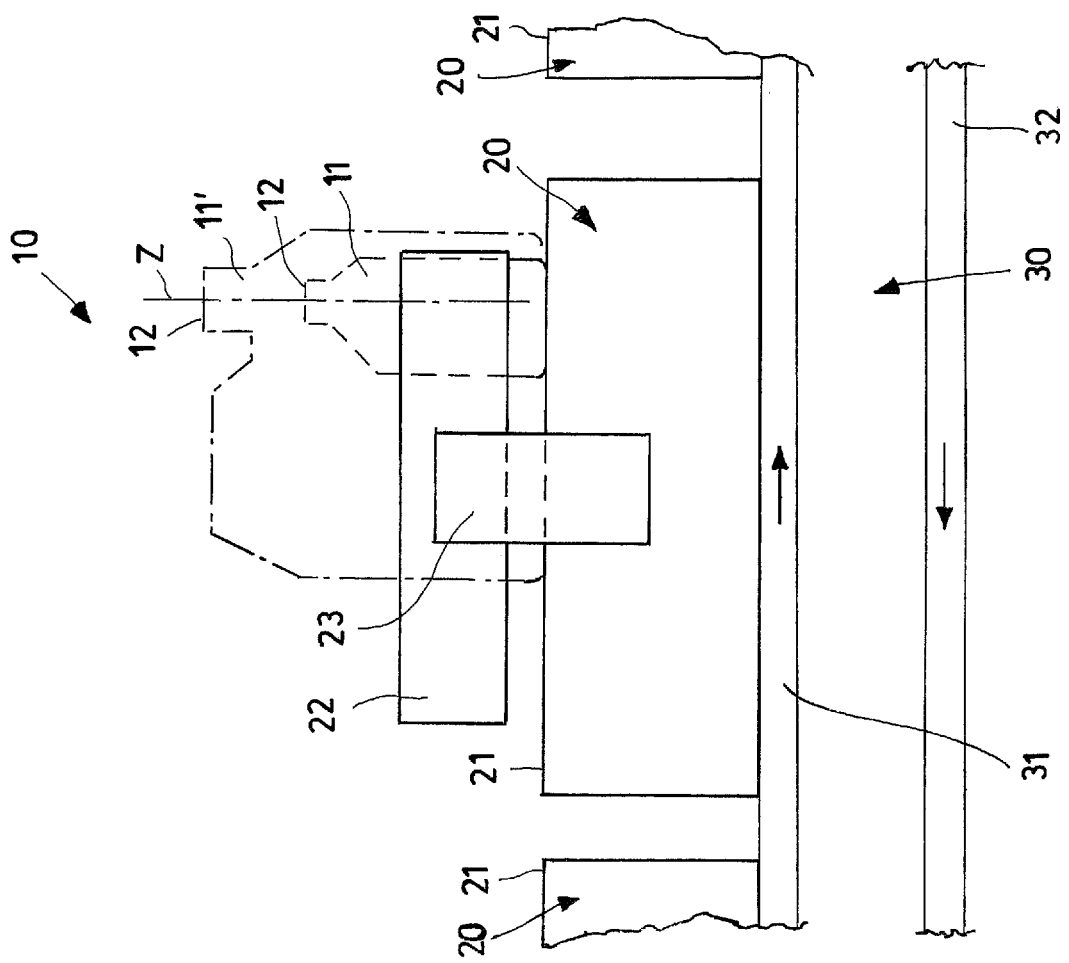
FIG. 1 is a raised side view of a step-wise feeding device of containers on which two different containers are shown schematically.

The transportation means 30, shown schematically in FIGS. 1 and 2 through a transportation branch 31 and a return branch 32, can be of any type suitable for receiving the support bases 20, spaced apart from one another, according to any step, also varying.

Each support base 20 comprises a clamping group of the container 11, 11', which is self-centring with respect to the longitudinal axis X of the base, coinciding with the feeding direction. Thus, the clamping group is provided with a stroke, which is symmetrical with respect to the plane of symmetry Y of the containers 11, 11', in a transverse direction with respect to the feeding direction of the support bases 20.

The gripper-type clamping group shown in the figures comprises two flat side boards 22, arranged parallel to the feeding direction of the support base, sustained by supports 23, on opposite sides of the support base 20, which move in a self-centring manner with respect to the axis X.

The arrangement of the side boards 22 of the clamping group parallel to the feeding direction of the support base 20 makes it possible to insert the container 11, 11' both from above and from a transportation with the same feeding axis of the support base, which is particularly suitable for continuous movement machines.

The self-centring clamping group has a closed clamping position on the container and an open loading and unloading position of the container. According to the embodiment shown as an example in the figures, the boards 22 are kept in the usually closed state by one or more return springs 24.

Each support base 20 comprises its own actuation means of the clamping group, which must be independent, i.e. not fed and not constrained to the transportation means 30 with respect to which they must be releasable.

According to the illustrative embodiment shown, the actuation means are independent actuation kinematics comprising a rack 25, which engages on a pinion gear 26 associated with every board 23. The pinion gear 26 rotates on its central axis through a lever 27, provided with a cog 28 at the end.

The actuation means comprise at least one mechanical control element 29, which, arranged in a predetermined fixed position along the path of the support base 20, controls the opening of the self-centring clamping group. Similarly, a second mechanical control element 29, arranged in a different predetermined fixed position along the path of the support base 20, controls the closing of the self-centring clamping group.

The control elements 29 are arranged in two predetermined fixed positions along the path of the support base 20 and placed outside the support base 20, in particular, acting laterally on the same.

In the illustrated example, the mechanical control element 29 comprises a fixed cam profile, arranged laterally to the feeding direction of the support base 20, which has the object of moving the cog 28 and controlling the opening and closing of the boards 22.

The variations on the shape and sizes of the containers 11, 11', which can be fed from the device 10 according to the invention are the length, measured along the longitudinal axis X of the support base 20, the width, measured orthogonally to the axis X, and the height of the position of the mouth 12 with respect to the bearing plane 21.

For containers 11 with a volume from 0.51 to 11, which constitute an example of the smaller containers, which can be managed by the feeding device 10, the width can be comprised from 46 mm to 87 mm, the length can be comprised from 46 mm to 130 mm and the diameter can be comprised from 46 mm to 87 mm.

For containers 11' with a volume from 31 to 51, which constitute an example of the larger containers, which can be managed by the feeding device 10, the width can be comprised from 91 mm to 147 mm, the length can be comprised from 91 mm to 240 mm and the diameter can be comprised from 91 mm to 147 mm.

It follows that the self-centring clamping group has a stroke between the closed position and the open position with an excursion varying from 23 mm to 53 mm per side for the container 11 smaller with respect to the container 11', which is larger.

A virtual point C is defined on the support base 20, placed on the axis X at a fixed distance from the front end of the support base 20, designed for centring the mouth 12 of the container 11, 11', for any type of container.

A step-wise feeding device of containers equipped with a mouth and with a plane of symmetry passing through the mouth according to the invention is fed with containers 11, 11' having dimensions falling within the defined limits, with the longitudinal axis corresponding to the axis X of the support base and with the mouth 12 having an axis Z coinciding with the virtual point C defined on the support base 20.

After positioning the container 11, 11' on the support base 20, the side boards 22, which act as a gripper usually held closed by the spring 24, associate it stably with the support base 20.

The support base 20 integral with the container 11, 11', is then conveyed to the machine by the transportation means 30.

At the end of the transportation of the container 11, 11' by means of the support base 20, the side boards 22 are opened against the force exerted by the spring 24 and the container 11, 11' is disengaged from the support base 20.

In greater detail, according to what is shown for the realisation of the device 10 in FIGS. 3 and 4, in the initial start-up situation of the transportation cycle, i.e. before loading the container 11, 11', the support base 20 is moving according to the axis X and it is with the boards 22 in the closed position and the cog 28 in the rest position E. In FIGS. 3 and 4, the boards 22 are shown in the closed position with a dotted line and in the open position with a continuous line.

During the movement of the support base 20, the cog 28 meets a first control element, in the example, the fixed cam 29, which causes the lever 27 to move into the open position F and the consequent rotation of the gear 26, from which the opening of the boards 22 derives.

A device external to the system positions the container 11, 11' with the longitudinal axis corresponding to the axis X of the support base 20 and with the mouth 12 to the axis Z, arranged in the centre of the virtual point C defined on the support base 20.

With the container 11, 11' in the predetermined position on the support base 20, and while the support base 20 is moving forwards in the feeding direction, the cog 28 guided by the control element, in the example, the fixed cam 29, causes the lever 27 to rotate with a return movement into the rest position E, from which the rotation of the gear 25 derives, which allows the boards 22 to rest on the container 11, 11' by means of the load given by the spring 24.

At this point the container 11, 11' is in the desired position on the support base 20 and integral with the latter.

The support base 20 with the container 11, 11' having the mouth 12 on the centre of the point C, passes inside the machine bringing the mouth 12 into the position useful for treating, for example, in the various carousels, which make up the machine, such as, for filling, capping, or others, or into a linear machine.

At the end of the final processing, the support base 20 is unloaded onto an outlet transportation.

During the movement of the support base 20, the cog 28 meets a further control element, in this case the fixed cam 29, which causes the lever 27 to move from a rest position E into an open position F, the rotation of the gear 26 and, consequently, the opening of the boards 22.

With the boards 22 open, a device external to the system takes the container 11, 11' and deposits it onto an evacuation transportation.

During the movement of the support base 20, the cog 28 guided by the control device, which in this case is the fixed cam 29, causes the lever 27 to move with a return movement into the rest position E, the rotation of the gear 26, and, consequently, the closure of the boards 22 under the action of the spring 24.

The support base 20 returns to the initial state of start-up of the transportation cycle.

The step-wise feeding device of containers, subject of the present invention, has the advantage of adapting to a wide variety of containers in terms of overall shapes and sizes.

Advantageously, the centring of the container is carried out with respect to the axis passing through the mouth thereof, i.e. independently of the sizes and shape of the container, and held on the support base during the transportation of the container.

A further advantage consists of the fact that it is not necessary to replace the equipment when the container is changed.

Advantageously, the flat boards, i.e. without cavities, of the clamping group, are capable of holding containers of different shapes and sizes.

The arrangement of the cam control elements along the path of the support base in a lateral position thereto has the advantage of not requiring the execution of specific grooves or openings in the support base.

A further fundamental benefit for an automatic machine is that this device has the centre of the mouth of the container, on the centre of the predefined virtual point C arranged on the plane of the support base; in such way, it is not necessary to perform synchronism operations between the container and the various users of the machine when the container is changed. In fact, on changing the container, it is not necessary to intervene manually to change the templates, which hold the container, or to vary the users of the machine, which can be the filling valves, closing heads, or other.

The step-wise feeding device of containers as conceived herein is susceptible to numerous modifications and variations, all falling within the invention; furthermore, all details are replaceable by technically equivalent elements. In practice, the materials used, as well as the dimensions, can be of any type according to the technical requirements.

The invention claimed is:

1. A step-wise feeding device of containers equipped with a mouth and with a plane of symmetry passing through the mouth, comprising:
   a plurality of support bases; and
   transportation means for moving the support bases in a feeding direction, wherein
   each of the support bases is configured to be associated with the transportation means, as well as dissociated therefrom,
   each support base comprises a clamping group of a container, the clamping group having a closed clamping position on the container and an open loading and unloading position of the container and configured to clamp different shapes of containers that are symmetrical on a longitudinal axis and an axis that coincides with a moving direction of two side boards, and non-symmetrical having the mouth on the longitudinal axis but off-center with respect to the axis,
   the clamping group of the container is a gripper-type clamping group, comprising the two side boards, sustained by supports on opposite sides of the support base, which move in a self-centering manner with respect to the longitudinal axis that coincides with the feeding direction, the moving direction of the two side boards being perpendicular to the feeding direction, and
   each of the support bases has a bearing plane for a bottom of the container, on which a virtual point is defined, placed on the longitudinal axis at a fixed distance from a front end of the support base, for centering the mouth of any container arranged on the bearing plane.

2. The device according to claim 1, wherein the side boards are flat.

3. The device according to claim 1, wherein the boards are connected to one or more return springs, which keep the boards in a closed state.

4. The device according to claim 1, wherein each of the support bases comprises its own actuation means of the clamping group arranged on board of the same support base.

5. The device according to claim 4, wherein the actuation means of the clamping group is not fed and not constrained to the transportation means.

6. The device according to claim 5, wherein the actuation means of the clamping group comprises a rack which engages on a pinion gear, which rotates on its own central axis through a lever, provided with a cog at one end.

7. The device according to claim 1, further comprising at least one of a first and a second mechanical control element of at least one of an opening and a closing of the self-centering clamping group, arranged in two predetermined fixed positions along a path of the support base and outside the same respectively.

8. The device according to claim 7, wherein the control element comprises a fixed cam profile, arranged along the path of the support base, laterally to the feeding direction of the support base.

9. The device according to claim 1, wherein the virtual point is arranged on the longitudinal axis in any position electronically predeterminable on the gripper.

* * * * *